(12) United States Patent
Belofastow

(10) Patent No.: US 10,825,214 B2
(45) Date of Patent: Nov. 3, 2020

(54) PRIORITY BASED AUTOMATIC PLACEMENT OF LABELS ON CHARTS

(71) Applicant: MICROSOFT TECHNOLOGY LICENSING, LLC, Redmond, WA (US)

(72) Inventor: Nickolay Belofastow, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/796,906

(22) Filed: Oct. 30, 2017

(65) Prior Publication Data

US 2019/0130615 A1    May 2, 2019

(51) Int. Cl.
*G06T 11/60* (2006.01)
*G06T 11/20* (2006.01)
*G06F 16/23* (2019.01)
*G06F 40/166* (2020.01)

(52) U.S. Cl.
CPC .......... *G06T 11/60* (2013.01); *G06F 16/2365* (2019.01); *G06F 40/166* (2020.01); *G06T 11/206* (2013.01)

(58) Field of Classification Search
None
See application file for complete search history.

(56) References Cited

U.S. PATENT DOCUMENTS

| | | | |
|---|---|---|---|
| 6,154,219 A | 11/2000 | Wiley et al. | |
| 7,292,244 B2 | 11/2007 | Vafiadis et al. | |
| 9,035,972 B2 | 5/2015 | Shiroor | |
| 9,361,719 B1 | 6/2016 | Demura | |
| 2001/0040583 A1* | 11/2001 | Yue | G06T 15/005 345/619 |
| 2013/0271493 A1 | 10/2013 | Shiroor | |
| 2016/0070984 A1 | 3/2016 | Watts et al. | |
| 2017/0236312 A1 | 8/2017 | Ruble et al. | |

FOREIGN PATENT DOCUMENTS

| | | |
|---|---|---|
| EP | 1320834 A1 | 6/2003 |
| EP | 1647896 A2 | 4/2006 |

OTHER PUBLICATIONS

Schwartges, Nadine, et al. "Point labeling with sliding labels in interactive maps." Connecting a Digital Europe Through Location and Place. Springer, Cham, 2014. 295-310.*

(Continued)

*Primary Examiner* — Zhengxi Liu
(74) *Attorney, Agent, or Firm* — Newport IP, LLC; David W. Foster

(57) ABSTRACT

Priority based automatic placement of labels on charts is provided. Display of data labels on a chart in a legible manner such that the data labels do not overlap and are placed in areas that may be more relevant to a user. In some examples, data associated with the chart may be prioritized for labeling (for example, prioritizing maximum, minimum, high rate of change, etc.), data labels may be disabled or hidden for low priority data points, overlapping of data labels may be avoided, and labeling may be automatically adjusted based on scaling and/or rescaling of the chart (for example, higher number of labels for bigger chart display).

17 Claims, 10 Drawing Sheets

(56) References Cited

OTHER PUBLICATIONS

Ngufor, Che, and Janusz Wojtusiak. "Unsupervised labeling of data for supervised learning and its application to medical claims prediction." Computer Science 14.2 (2013): 191.*

Theophil, Sebastian, and Arno Schödl. "An efficient algorithm for scatter chart labeling." Proceedings of the National Conference on Artificial Intelligence. vol. 21. No. 2. Menlo Park, CA; Cambridge, MA; London; AAAI Press; MIT Press; 1999, 2006.*

Author Unknown, "Peaks and Assignments", archived from https://www.cgl.ucsf.edu/home/sparky/manual/peaks.html on Jul. 6, 2010.*

"Adjusting the layout, size, and scale of a graph", Retrieved From <<https://www2.microstrategy.com/producthelp/10.6/AdvancedReportingGuide/WebHelp/Lang_1033/Content/AdvancedReporting/Adjusting_the_layout__size__and_scale_of_a_graph.htm>>, Retrieved on: Sep. 15, 2017, 11 Pages.

"MapInfo Professional", Retrieved From <<http://reference1.mapinfo.com/software/mapinfo_pro/english/12.0/MapInfoProfessionalUserGuide.pdf>>, Jun. 2010, 598 Pages.

"Quick Apps V6.2 for Sharepoint", Retrieved From <<http://support-public.cfm.quest.com/4406_quickappsforsharepoint_6.2_userguide.pdf>>, Aug. 2013, 506 Pages.

"Automatic Label Placement", Retrieved From: https://en.wikipedia.org/w/index.php?title=Automatic_label_placement&oldid=801441319, Retrieved Date: Sep. 19, 2017, 3 Pages.

Chamra, Tomas, "Algorithms for Automatic Label Placement", Retrieved From: https://dspace.cvut.cz/bitstream/handle/10467/69496/F3-DP-2017-Chamra-Tomas-thesis.pdf, May 25, 2017, 69 Pages.

"International Search Report and Written Opinion Issued in PCT Application No. PCT/US2018/052774", dated Jan. 4, 2019, 13 Pages.

\* cited by examiner

PRIORITY BASED AUTOMATIC PLACEMENT OF LABELS ON CHARTS

BACKGROUND

Charts, such as line charts and comparable variations, are among the popular data visualization techniques, widely used in electronic spread-sheets, data analysis software, etc. Data labels visualize data point values on charts. Users are used to placement of data labels on charts in automatic or semi-automatic manner, hence avoiding tedious and time-consuming manual placement. However, automatic data label placement in conventional chart applications is typically based on rigid and simplistic rules resulting in degradation of legibility such as overlapping of labels, crowding of the chart, etc.

Some chart applications may support automatic or semi-automatic data label placement based on algorithms that are typically designed for applications in cartography (such as simulated annealing or rule-based systems). Such algorithms may allow for quasi-optimal data label placements. However, complete avoidance of overlapping data label placement or priority based selection is not addressed by such approaches that typically treat all the vertices equally.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to priority based automatic placement of labels on charts. In some examples, data labels associated with vertices of a chart may be determined and priorities assigned to the determined data labels based on attributes of the vertices associated with the data labels. Overlap conflicts of a subset of the data labels within a sliding window on the chart may be resolved based on the assigned priorities and one or more predefined rules. Another subset of the data labels to be displayed on the chart may then be selected based on the assigned priorities and the overlap conflict resolution.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
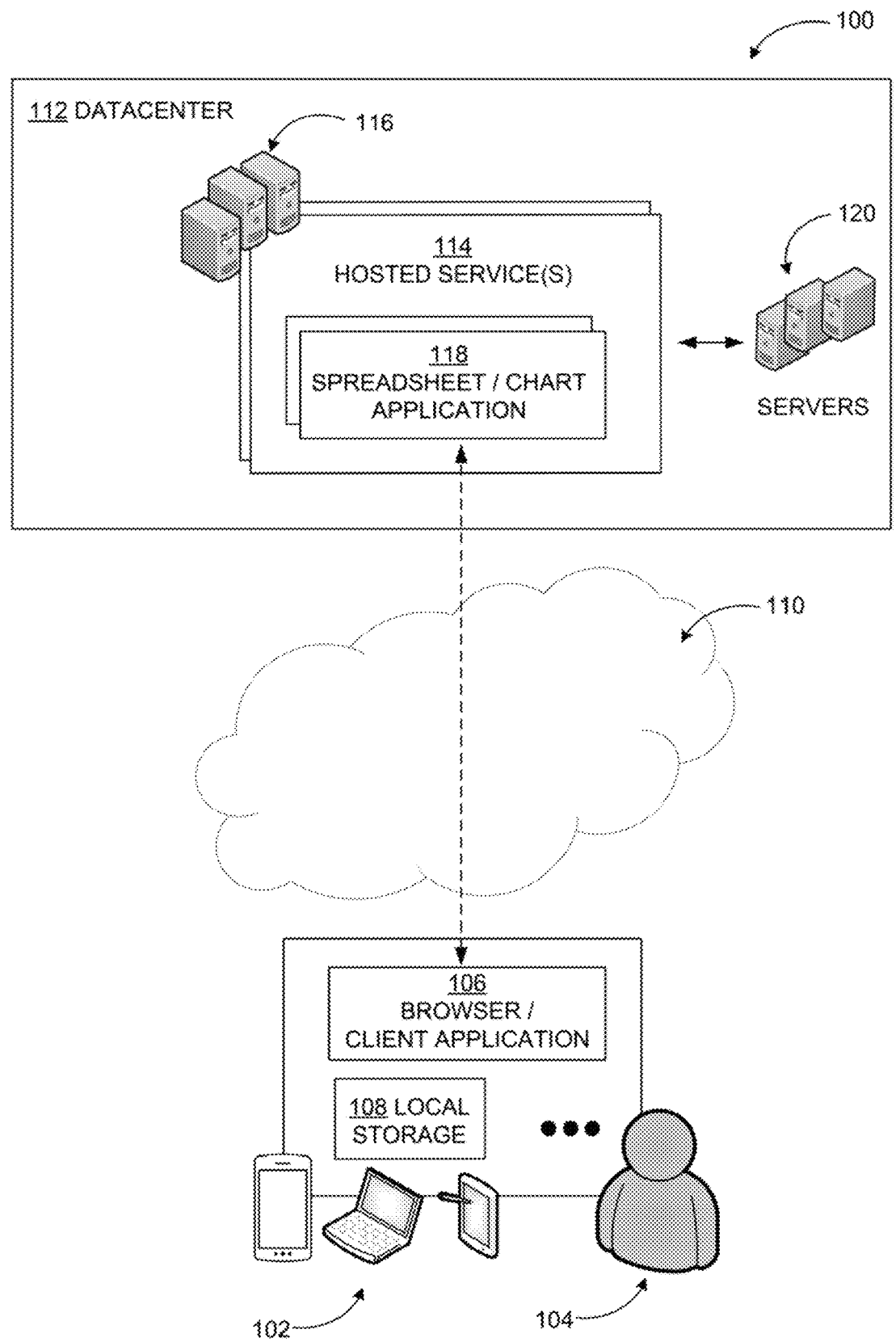
FIG. 1 includes a display diagram illustrating an example network environment where a system to provide priority based automatic placement of labels on charts may be implemented.

As briefly described above, embodiments are directed to display of data labels on a chart in a legible manner such that the data labels do not overlap and are placed in areas that may be more relevant to a user. In some examples, data associated with the chart may be prioritized for labeling (for example, prioritizing maximum, minimum, high rate of change, etc.), data labels may be disabled or hidden for low priority points, overlapping of data labels may be avoided, and labeling may be automatically adjusted based on scaling and/or rescaling of the chart (for example, higher number of labels for bigger chart display).

Example embodiments are described herein for priority based automatic placement of labels on charts. Example charts discussed in conjunction with some embodiments include line charts and data labels include data values. Embodiments are not limited to lien charts or data labels presenting data values. Any type of chart and data label may be combined using the principles discussed herein. Furthermore, applications, modules, and services performing priority based automatic placement of labels on charts may be implemented as software, hardware, or combinations thereof. Such applications, modules, or services may be executed on a local computing device or at a server and accessed by other computing devices.

In the following detailed description, references are made to the accompanying drawings that form a part hereof and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing priority based automatic placement of labels on charts. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes a display diagram illustrating an example network environment where a system to provide priority based automatic placement of labels on charts may be implemented.

As illustrated in diagram 100, an example system may include a datacenter 112 executing a hosted service 114 on at least one processing server 116, which may provide productivity, communication, cloud storage, collaboration, and comparable services to users in conjunction with other servers 120, for example. The hosted service 114 may further include scheduling services, online conferencing services, and comparable ones. The hosted service 114 may be configured to interoperate with a client application 106 through one or more client devices 102 over one or more networks, such as network 110. The client devices 102 may include a desktop computer, a laptop computer, a tablet computer, a vehicle-mount computer, a smart phone, or a wearable computing device, among other similar devices. In some examples, the hosted service 114 may allow users to access its services through the client application 106 executed on the client devices 102. In other examples, the hosted service 114 may be provided to a tenant (e.g., a business, an organization, or similar entities), which may configure and manage the services for their users.

In an example embodiment, as illustrated in diagram 100, the servers 116 may be operable to execute programs associated with the hosted service 114 and a spreadsheet or chart application 118 as part of the hosted service 114. The spreadsheet or chart application 118 may provide spreadsheet and/or charting functionality and generate charts based on underlying data. In other examples, the client application 106 may perform spreadsheet and/or charting functionality and generate charts in conjunction with the hosted service 114. In yet other examples, the client application 106 may provide the spreadsheet and/or charting functionality and generate charts locally without communication with the hosted service 114. As mentioned previously, embodiments are not limited to spreadsheet or chart applications, but may be implemented with any application that is capable of generating charts. For example, data access applications, presentation applications, data analysis applications, even word processing applications capable of generating charts based on tabular data may provide priority based automatic placement of labels on charts.

Thus, through priority based automatic placement of labels on charts, a system according to embodiments may enhance user interaction, reduce processing and network consumption (e.g., by avoiding manual creation/re-creation of data labels and the operations involved in those), and reduce data storage by reducing an amount of data to be stored in conjunction with the charts (i.e., number of data labels).

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large number of devices and users using hosted services.

Figure 2:
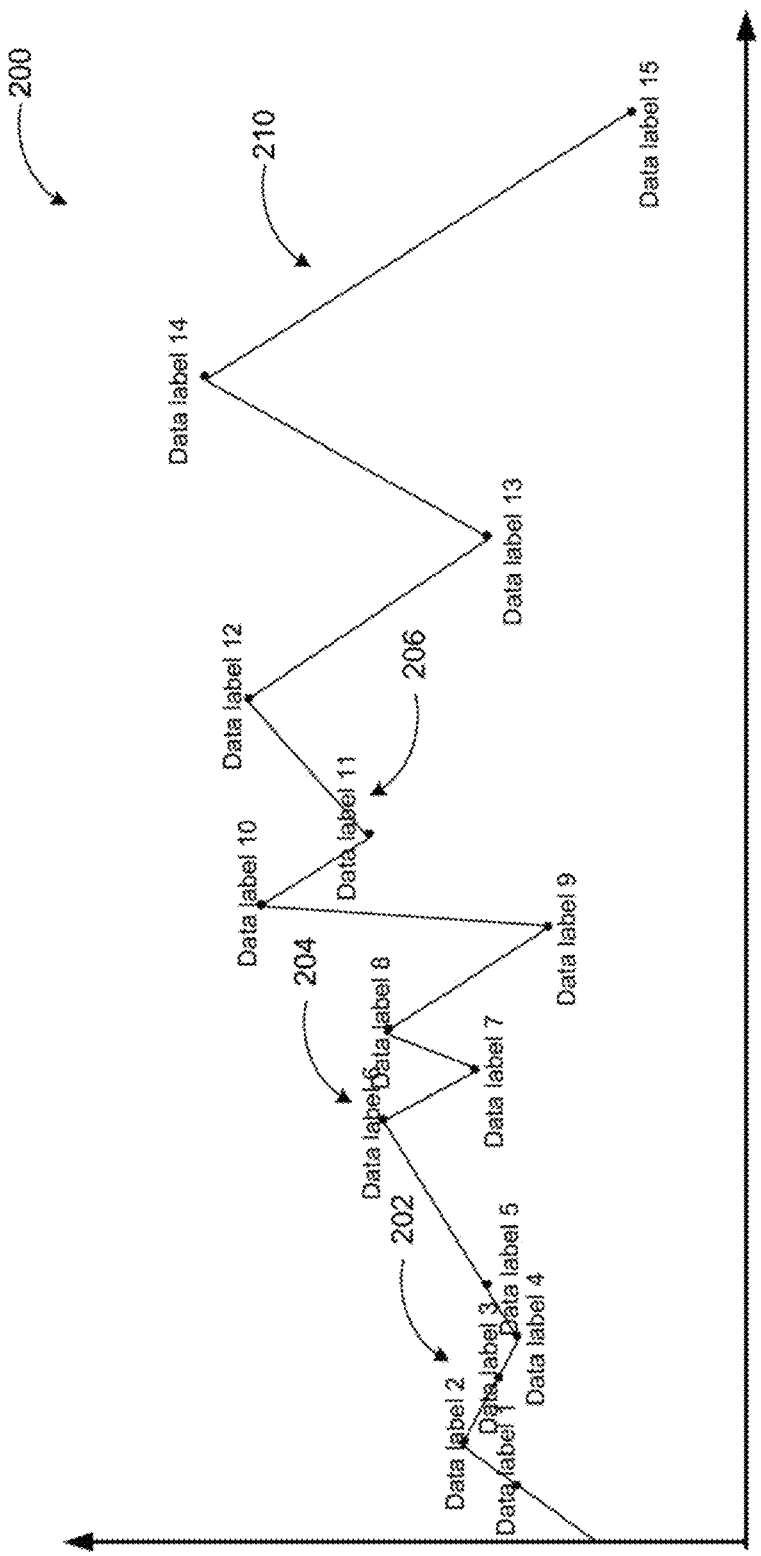
FIG. 2 includes an example conventional chart, where overlapping and crowding of data labels may degrade legibility of the chart.

FIG. 2 includes an example conventional chart, where overlapping and crowding of data labels may degrade legibility of the chart.

As shown in diagram 200, a line chart 210 may represent underlying data across orthogonal axes. The line chart 210 is generated based connecting data points. The data points may correspond to vertices on the line chart 210 or may also be part of a linear increase of decrease, that is, two or more data points may be present along a linear segment of the line chart 210. A conventional chart application may place data labels in a vicinity (above, below, to the left, or to the right) of each data point. The data labels may contain values of the data points or information derived from the values (e.g., different formattings, graphic representations, classification identifiers, etc.).

By placing data labels in a vicinity of each data point, a number of issues may arise possibly degrading legibility of the chart and user experience. For example, where data points are concentrated, an overcrowding 202 may occur with various data labels overlapping with each other. A similar overcrowding 204 may occur when distinct vertices of the line chart are in close proximity. A further legibility degrading effect may result from placement of the data labels statically. If the data labels are placed statically above, below, to the left, or to the right of a data point without considering the data point type (e.g., a maximum or a minimum), the data label may overlap with the chart itself.

Figure 3:
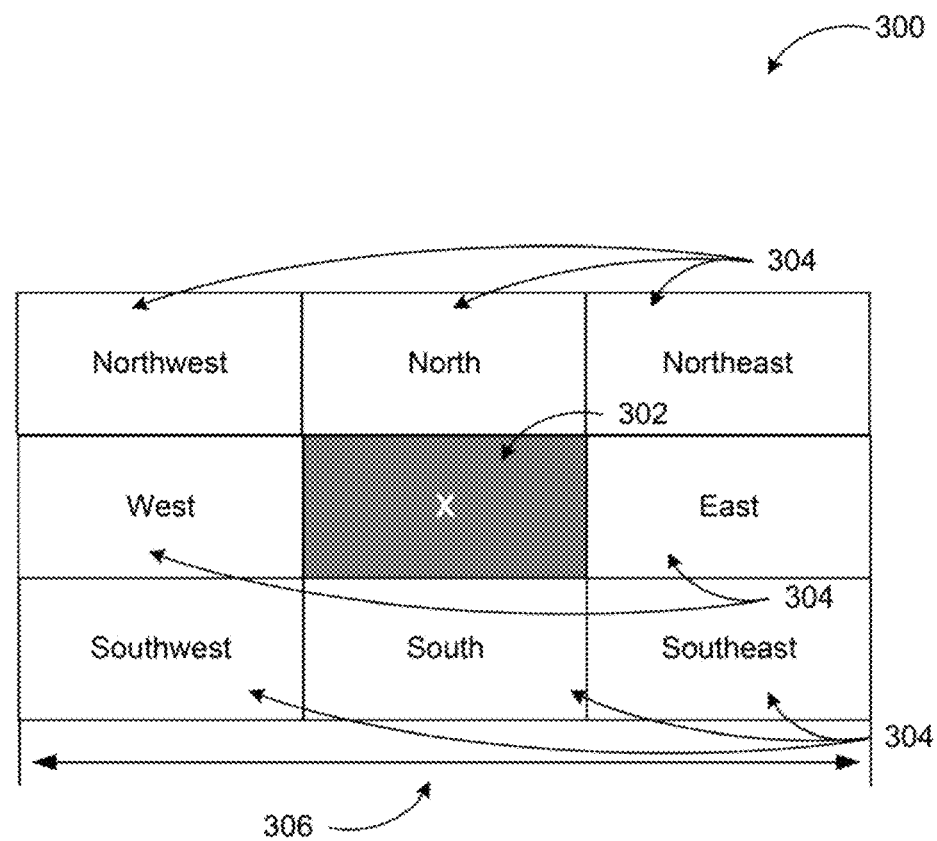
FIG. 3 includes a display diagram illustrating an example data label location matrix for priority based automatic placement of labels on charts.

FIG. 3 includes a display diagram illustrating an example data label location matrix for priority based automatic placement of labels on charts.

As discussed above, priority based automatic placement of data labels on charts may be provided by determining data labels associated with vertices of a chart and assigning priorities to the determined data labels based on attributes of the vertices associated with the data labels. Overlap conflicts of a subset of the data labels within a sliding window on the chart may be resolved based on the assigned priorities and one or more predefined rules. Another subset of the data labels to be displayed on the chart may then be selected based on the assigned priorities and the overlap conflict resolution.

Different data points may have varying levels of importance for a user. For example, data points corresponding to a global minimum or maximum of the data series may have a higher value for the user, while regular vertices, which may not reflect any substantial trending in the data series may of lesser interest. According to some embodiments, a fast automatic or semi-automatic data label placement approach on charts may introduce a notion of data point priority, which may determine an optimal data label placement relative to a corresponding chart vertex as well as a set of rules for resolving conflict among two or more closely located data points. The conflict resolution mechanism may place the data labels with higher priority and remove or hide data labels with lesser priority, while still placing as many data labels on the chart as possible. In the semi-automatic mode, the user may be provided with an option to select specific priorities of the data points they wish to see on the chart. In the fully-automatic mode, all priorities may be taken into consideration.

A chart visualizes a data series. For example, a two-dimensional chart may include category data, represented by the X-axis, and value data, represented by the Y-axis. Thus, Cartesian coordinate system may be used in some example data label placement approaches. Other embodiments may be implemented on three-dimensional charts or using other coordinate systems such as polar coordinates, cylindrical coordinates, spherical coordinates, or homogeneous coordinates, for example. The data points may be sorted by their category data in ascending order prior to performing their layout on the charting area according to example embodiments. A typical chart layout pipeline may assume a certain stage, where the original data points are processed to produce a correspondent set of data vertices. Depending on an actual size of the charting area (e.g., dictated by the size of physical display or size of the displayed user interface), the number of vertices may be smaller than the number of the original data points due to removal or hiding of adjacent data points.

The data label placement may employ a sorted collection of data vertices as input. Each vertex may include a set of X-Y coordinates, as well as, the values of its category and value, taken from the original data set. A finite set of vertex types and their relative priorities (e.g., "1" may be assigned as the highest priority) may be used. Table 1 illustrates a practical example of vertices and priorities:

TABLE 1

Example vertices and priorities

| Vertex type | Priority |
|---|---|
| Series Start | 1 |
| Series End | 1 |
| Global Minimum | 2 |
| Global Maximum | 2 |
| Local Minimum | 3 |
| Local Maximum | 3 |
| Regular | 4 |

In the case, when two or more data labels overlap, the labels with lower priorities may be removed from the chart or hidden, while the higher priority labels may remain on the chart clearly visible and unobstructed. Every vertex, depending on its type, may define an optimal data label placement. Diagram 300 shows an example location matrix with eight possible data label locations 304 relative to the location 302 of the corresponding vertex. For example, if the vertex type is "Local Maximum" or "Global Maximum", the optimal label location may be "North", centered just above the vertex, while "South", centered below the vertex, may be suitable for the vertices of type "Local Minimum" or "Local Maximum". Given the considerations above, a horizontal conflicting range 306 may be used for a vertex—from the leftmost possible X-coordinate to the rightmost one.

The conflicting range 306 may span from the vertex X-coordinate to the left and right for the maximal possible horizontal length of data label, including horizontal padding, as defined by:

$$\text{ConflictRange} = \text{Vertex}(X) \pm (\text{MaxDataLabelWidth} + \text{Padding}) \quad [1]$$

Because different data labels may have different widths depending on their content, the width of the widest label for the chart may need to be determined. For this purpose, the collection of data vertices may be traversed and every label for the chart measured.

Figure 4:
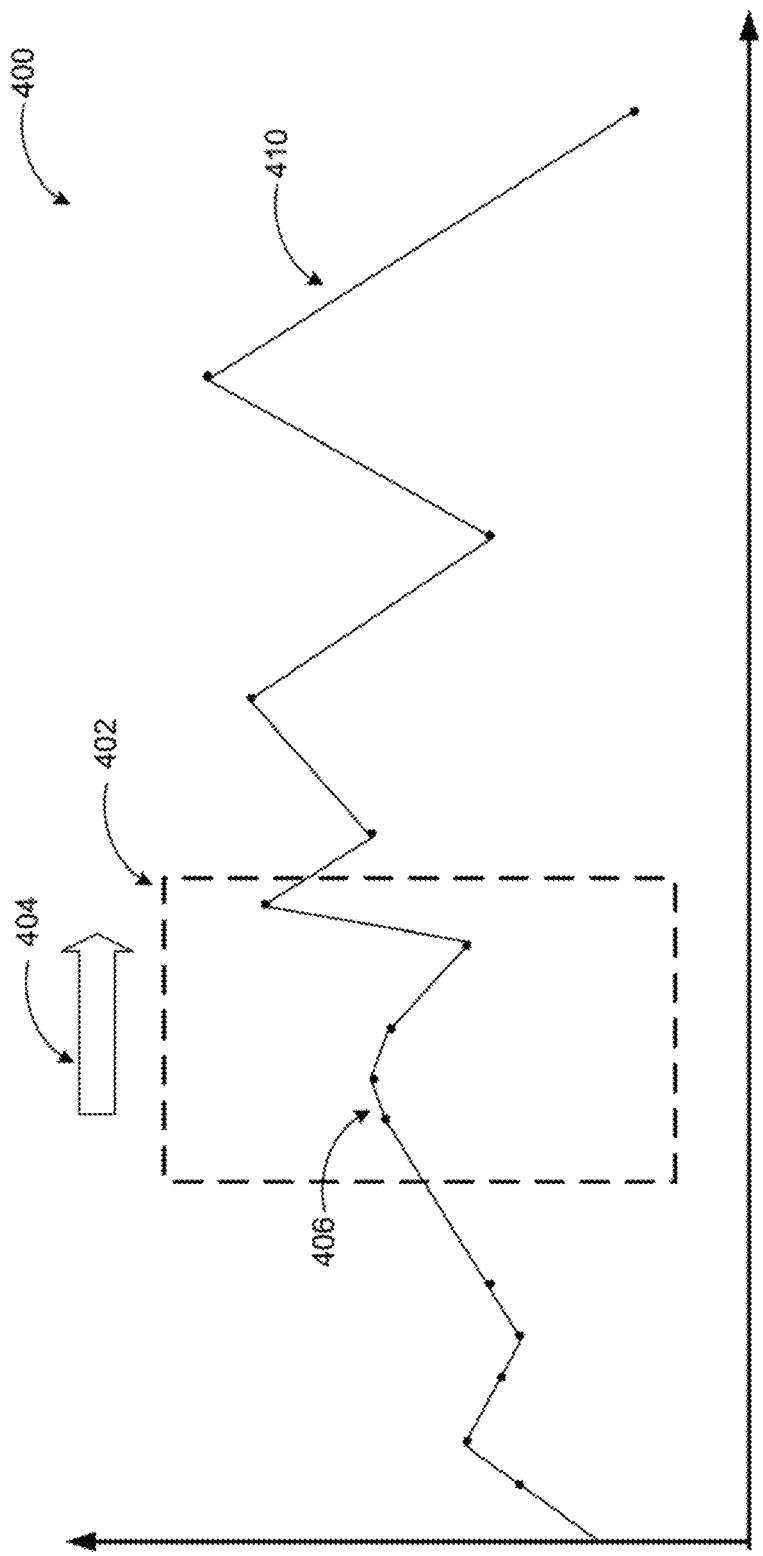
FIG. 4 includes a display diagram illustrating the use of a sliding window in processing overlap conflicts on a chart using priority based automatic placement of labels on charts.

FIG. 4 includes a display diagram illustrating the use of a sliding window in processing overlap conflicts on a chart using priority based automatic placement of labels on charts.

A data label placement approach according to embodiments may iterate over the collection of data vertices, which may be sorted based on their category data (that is their X-coordinate). At every iteration, a next vertex may be processed. For the iterative process, a sliding window may be maintained that stores information about the previously processed data labels, meaning the X-coordinates of the processed (stored) vertices are less or equal to an X-coordinate of a currently being processed vertex.

Diagram 400 shows an example sliding window 402 being iteratively moved across the chart 410 along the X-axis direction 404 with data points 406 inside the window. The sliding window 402 may be implemented as a priority-queue, and the data labels may be sorted based on not exceeding a right edge (NER) as defined below:

$$\text{NER} = \text{Vertex}(X) + (\text{MaxDataLabelWidth} + \text{Padding}) \quad [2]$$

The priority queue may be implemented as a minimum-based queue, that is, the top element has the smallest NER among the data labels in the queue. A data label of a newly processed vertex may be characterized by not exceeding the left edge (NEL) as defined below:

$$\text{NEL} = \text{Vertex}(X) - (\text{MaxDatatLabelWidth} + \text{Padding}) \quad [3]$$

The data labels, whose NER is less than a NEL of the currently processed data label may not have any conflict with any previously processed data labels. If NER<NEL, the data labels may be guaranteed to have no conflict with any of the currently unprocessed data labels either. Hence those data labels may be classified as placed (on the chart) and removed from the sliding window. Through the priority-based queue approach, the purging of the conflicting data labels may be implemented efficiently.

As a result, the sliding window may include only the data labels, which may potentially conflict with a newly processed data label, and the window may slide left-to-right in the process of iteration over unprocessed data labels. Subsequently, the sliding window may be traversed for a newly processed data label to identify possible conflicts (overlaps). If there is no overlap, the newly processed data label may be placed in the queue and a next vertex may be processed as above. If there is conflict (overlap), a priority based conflict resolution may be performed—a data label with lower or equal priority may be removed. If the data label with lower or equal priority in a conflict is the newly processed data label, its processing may be completed and the next vertex processed as described above. If the newly processed data label is of higher priority, the data label from the sliding window may be removed.

Figure 5:
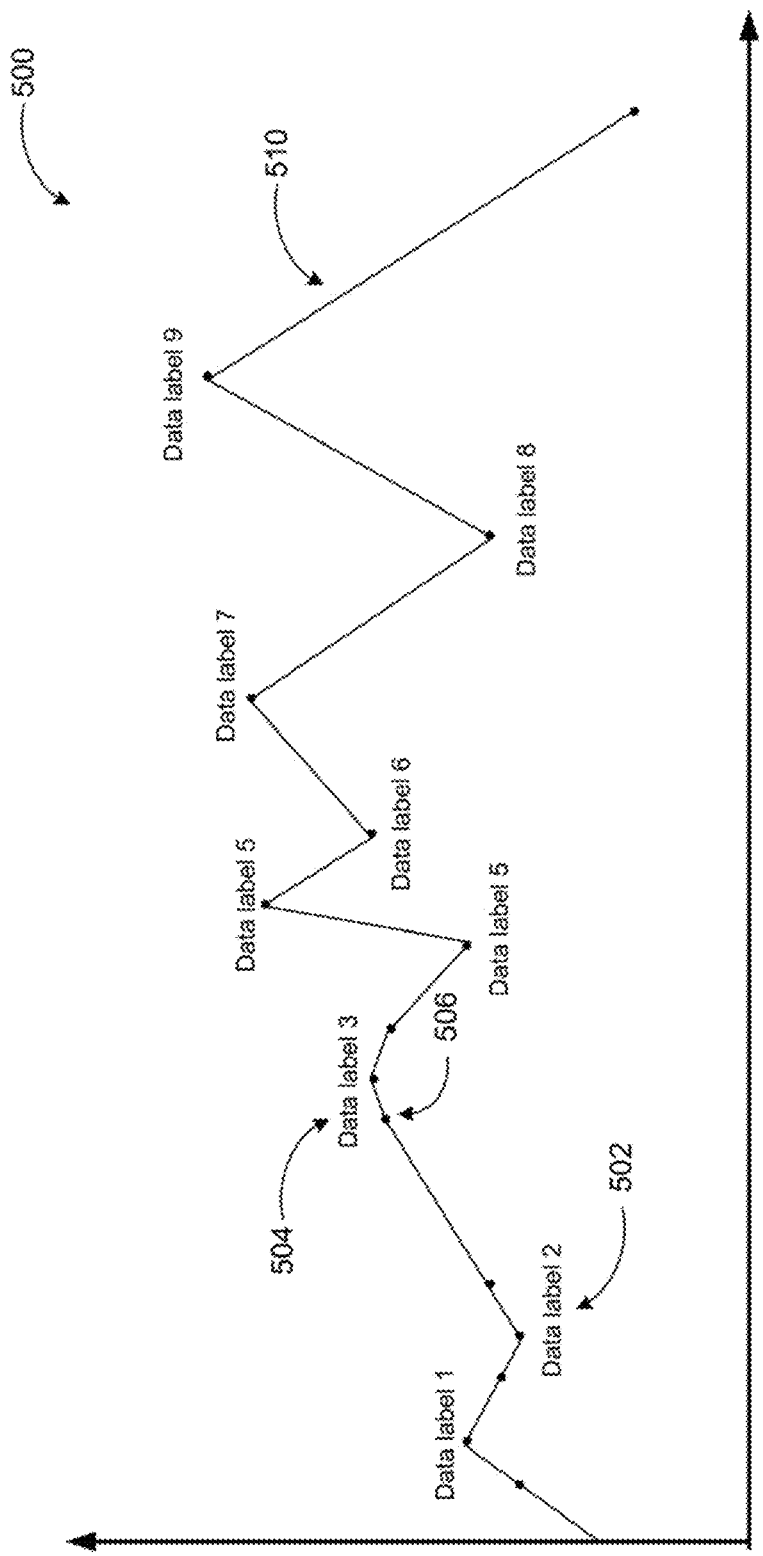
FIG. 5 is an example chart with data labels placed according to some embodiments.

FIG. 5 is an example chart with data labels placed according to some embodiments.

The chart 510 shown in diagram 500 may be processed by a system according to embodiments and data label placements optimized through the use of data point priorities and overlap conflict resolution. Locations of data labels may also be selected using a location matrix as described herein. Thus, in the resulting chart, data labels may be placed above or below vertices depending on vertex type such as data label 502. When closely located data points are encountered, the number of data labels may be reduced by hiding data labels for data points that do not indicate substantial trend change in the chart (e.g., data point 506) and selecting data points that indicate substantial trend change such as local or global minima or maxima (e.g., data label 504).

As discussed above, data label selection and placement is not limited to minima or maxima, but data points that indicate substantial trend change while maximizing a number of data labels without degrading legibility of the chart. Furthermore, embodiments are not limited to line charts as shown in the figure. Other types of charts such as bar charts, pie charts, etc., two- or three-dimensional, may also be processed for optimal data label placement using the principles discussed herein.

The examples provided in FIGS. 1 through 5 are illustrated with specific systems, services, applications, modules, and configurations. Embodiments are not limited to environments according to these examples. Priority based automatic placement of labels on charts may be implemented in environments employing fewer or additional systems, services, applications, modules, and displays. Furthermore, the example systems, services, applications, modules, and configurations shown in FIG. 1 through 5 may be implemented in a similar manner with other systems or action flow sequences using the principles described herein.

Figure 6:
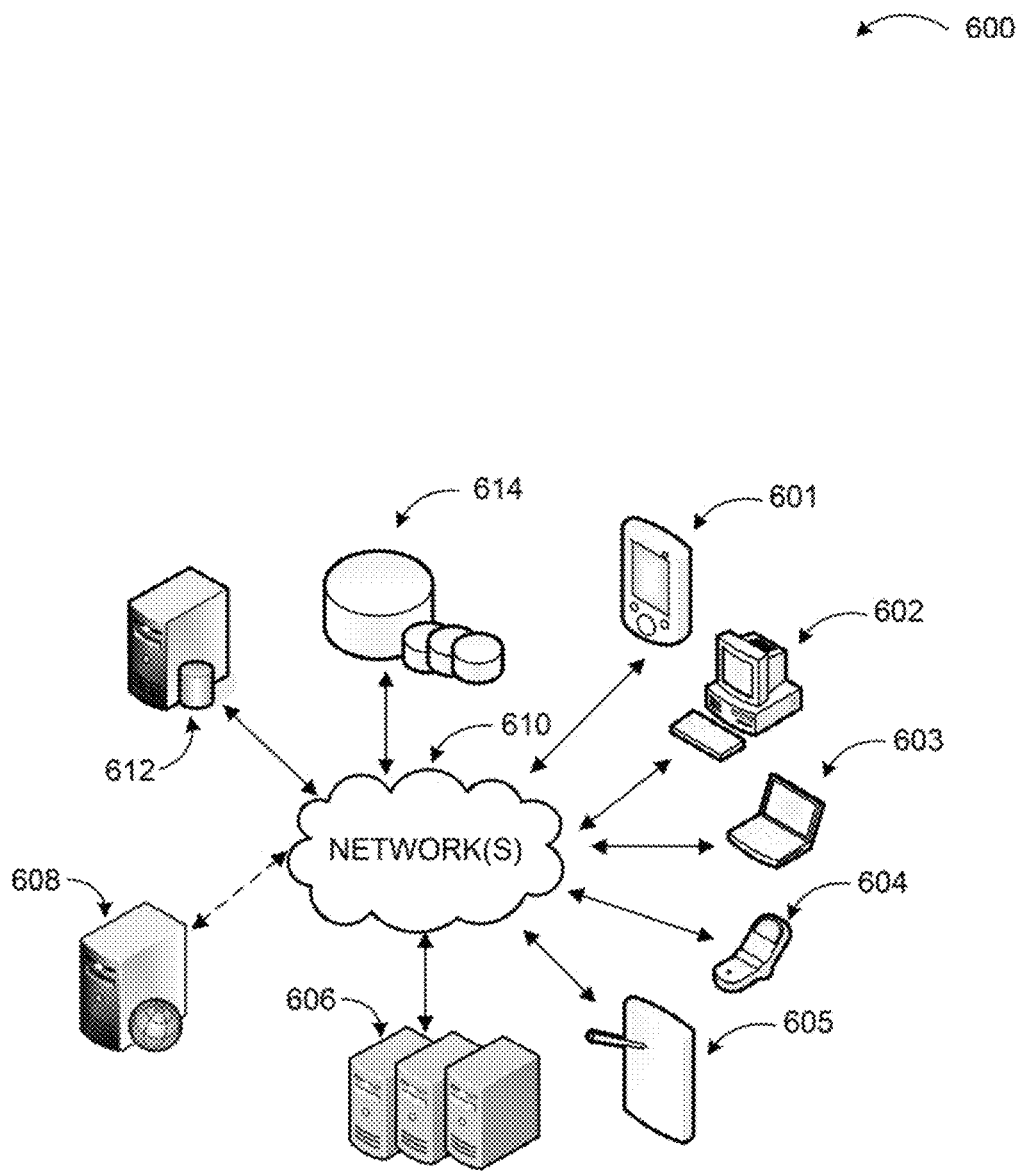
FIG. 6 is a networked environment, where a system according to embodiments may be implemented.

FIG. 6 is a networked environment, where a system according to embodiments may be implemented.

A chart application as described herein may be employed in conjunction with hosted applications and services (for example, hosted service 114) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface, such as a dashboard, presented to users.

Client devices 601-605 are used to access the functionality provided by the hosted service or client application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed to provide priority based automatic placement of labels on charts. Furthermore, the networked environments discussed in FIG. 6 are for illustration purposes only. Embodiments are not limited to the example applications, engines, or processes.

Figure 7:
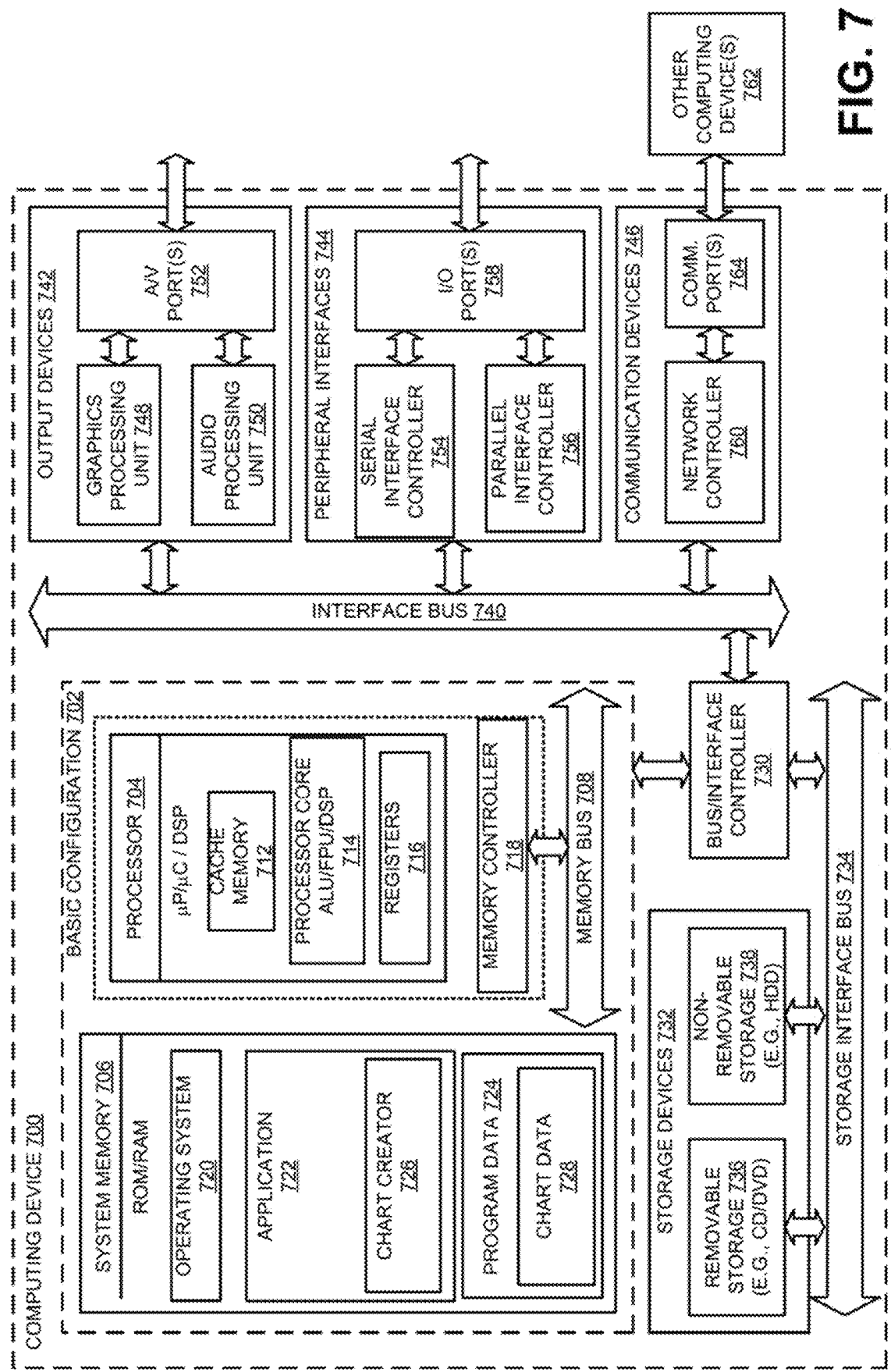
FIG. 7 is a block diagram of an example computing device, which may be used to provide priority based automatic placement of labels on charts.

FIG. 7 is a block diagram of an example computing device, which may be used to provide priority based automatic placement of labels on charts.

For example, computing device 700 may be used as a server, desktop computer, portable computer, smart phone, special purpose computer, or similar device for executing a management application or module for a datacenter. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, an application or service 722, and program data 724. The application or service 722 may include a chart creator 726, which may be an integrated component of the application or service 722. The chart creator 726 may be configured to display data labels on a chart in a legible manner such that the data labels do not overlap and are placed in areas that may be more relevant to a user. The chart creator 726 may prioritize data associated with the chart for labeling (for example, prioritizing maximum, minimum, high rate of change, etc.), disable or hide data labels for low priority data points, avoid overlapping of data labels, and automatically adjust labeling based on scaling and/or rescaling of the chart. The program data 724 may include, among other data, chart data 728 as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide priority based automatic placement of labels on charts. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8A:
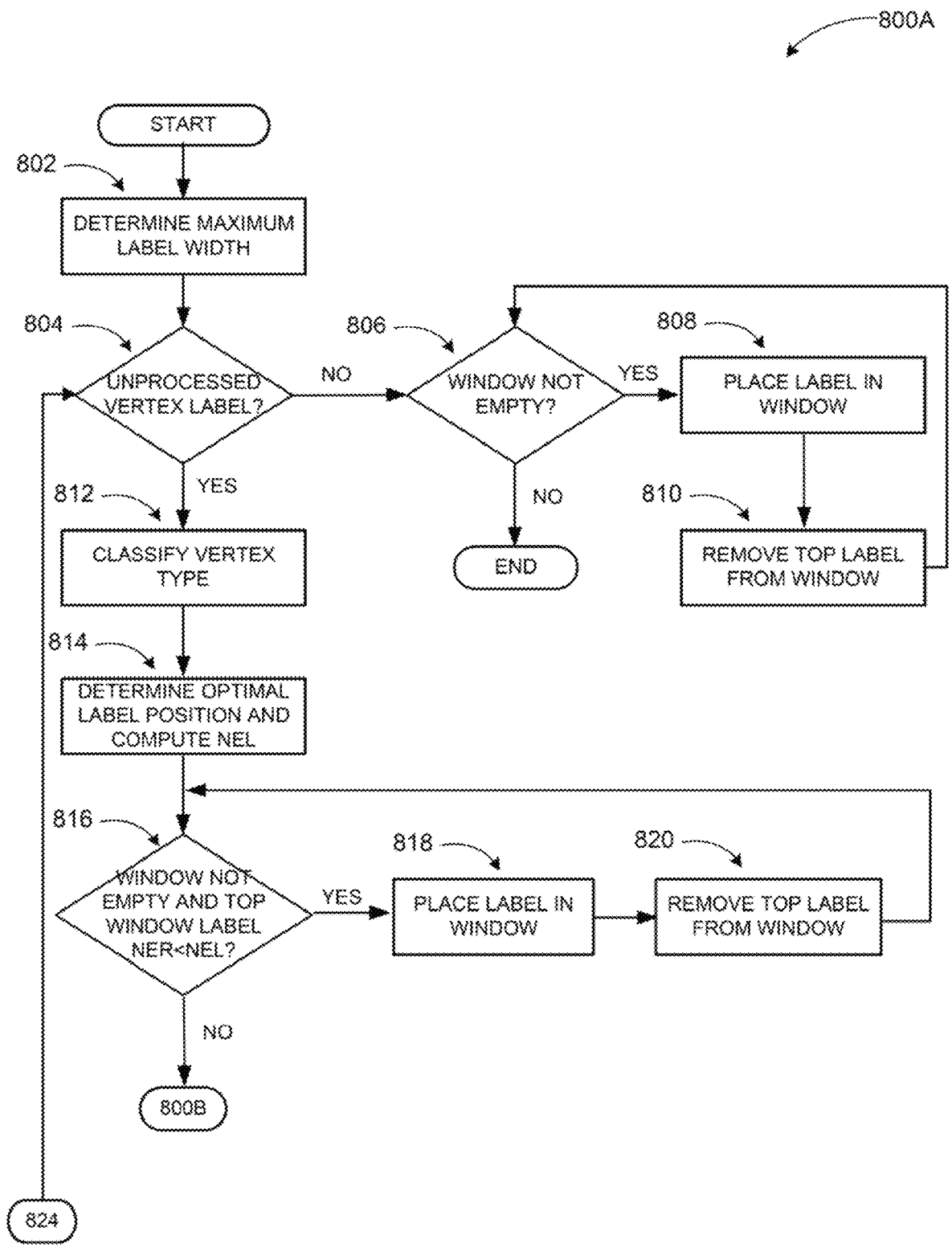
FIGS. 8A and 8B illustrate a logic flow diagram of a method to provide priority based automatic placement of labels on charts.
Figure 8B:
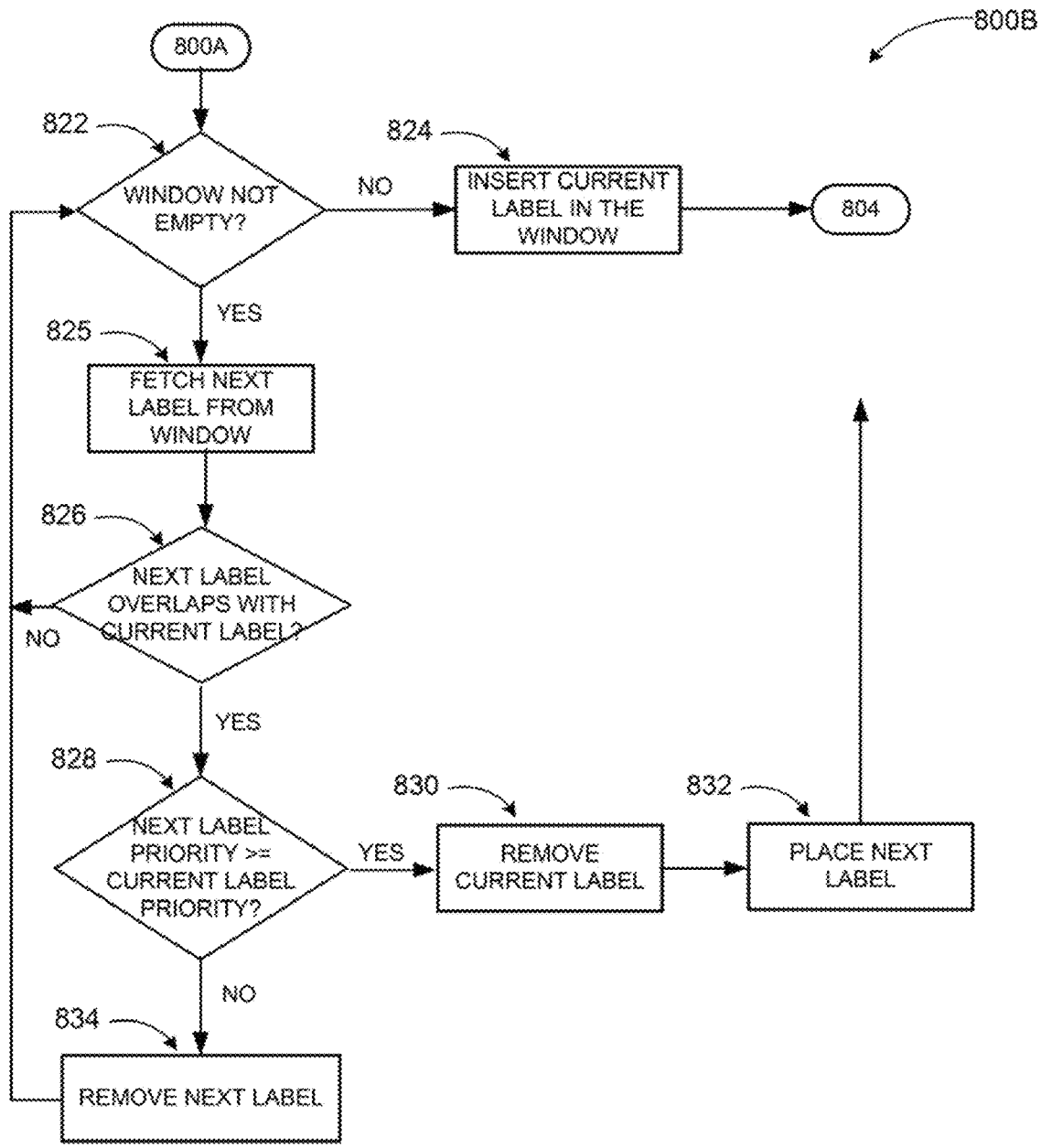

FIGS. 8A and 8B illustrate a logic flow diagram of a method to provide priority based automatic placement of labels on charts.

Processes 800A and 800B may be implemented on a computing device, server, or other system. An example server may comprise a communication interface to facilitate communication between one or more client devices and the server. The example server may also comprise a memory to store instructions, and one or more processors coupled to the memory. The processors, in conjunction with the instructions stored on the memory, may be configured to provide priority based automatic placement of labels on charts.

Process 800A begins with operation 802, where a maximum label width may be determined based on content and formatting of data labels associated with the chart that is being processed. At decision operation 804, a determination may be made whether there are unprocessed vertex labels or not. If the determination is negative, another determination may be made at decision operation 806 whether the sliding window is empty or not. If the window is empty processing may stop. If the window is not empty, the next label may be placed as top data label in the sliding window at operation 808. The top label in the window may then be removed at operation 810 looping with the decision operation 806.

If the determination at decision operation 804 is affirmative, a vertex type may be determined at operation 812. Next, an optimal label position may be determined based on the vertex type and a NEL computed as discussed above at operation 814. At decision operation 816, a determination may be made whether the window is not empty and NER<NEL is true for the top label in the window. If the determination is affirmative, processing may move to operation 818, where the next label may be placed as top data label in the sliding window. The top label in the window may then be removed at operation 820, and processing looped back to decision operation 816. If the determination is negative, processing may move to operation 822 in process 800B.

Process 800B may include decision operation 822, where a determination may be made whether the window is empty. If the determination is negative, the current label may be inserted into the window at operation 824 and processing may return to decision operation 804. If the determination is affirmative, processing may move to operation 825, where the next label may be fetched from the window and processing continue to decision operation 826. At decision operation 826, a determination is made whether the next label overlaps with the current label. If the determination is negative, processing may return to decision operation 822. If the next label overlaps with the current label, processing may move to decision operation 828, where a determination may be made whether a priority of the next label is greater or equal to a priority of the current label. If the determination is negative, the next label may be removed and processing may return to decision operation 822. If the determination is affirmative, processing may move to operation 830, where the current label may be removed. At operation 832, the next label may be placed and processing returned to decision operation 804.

Figure 9:
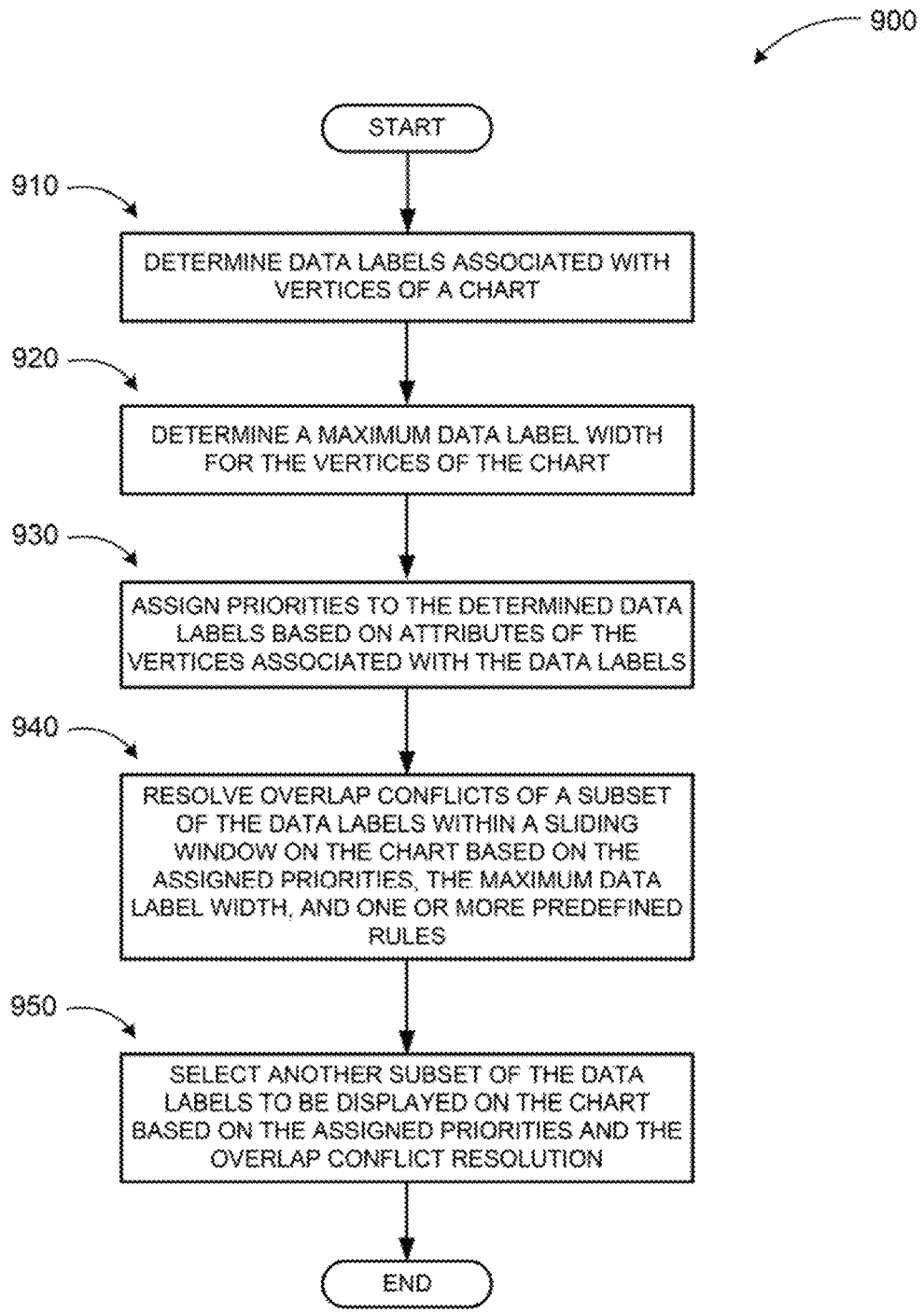
FIG. 9 illustrates a logic flow diagram of another method to provide priority based automatic placement of labels on charts, some of which are arranged in accordance with at least some embodiments described herein.

FIG. 9 illustrates a logic flow diagram of another method to provide priority based automatic placement of labels on charts.

Process 900 begins with operation 910, where data labels associated with vertices of a chart may be determined. At operation 920, a maximum data label width for the vertices of the chart may be determined. Subsequently, at operation 930, priorities may be assigned to the determined data labels based on attributes of the vertices associated with the data labels. At operation 940, overlap conflicts of a subset of the data labels within a sliding window on the chart may be resolved based on the assigned priorities, the maximum data label width, and one or more predefined rules by iteratively moving the sliding window across an axis of the chart such that a set of sorted vertices are within the sliding window at each iteration. At operation 950, another subset of the data labels to be displayed on the chart is selected based on the assigned priorities and the overlap conflict resolution.

The operations included in processes 800A, 800B, and 900 are for illustration purposes. Priority based automatic placement of labels on charts may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing priority based automatic placement of labels on charts is described. The means may include a means for determining data labels associated with vertices of a chart, a means for assigning priorities to the determined data labels based on attributes of the vertices associated with the data labels, a means for resolving overlap conflicts of a subset of the data labels within a sliding window on the chart based on the assigned priorities and one or more predefined rules, and a means for selecting another subset of the data labels to be displayed on the chart based on the assigned priorities and the overlap conflict resolution.

According to some examples, a method to provide priority based automatic placement of labels on charts is described. The method may include determining data labels associated with vertices of a chart, assigning priorities to the determined data labels based on attributes of the vertices associated with the data labels, resolving overlap conflicts of a subset of the data labels within a sliding window on the chart based on the assigned priorities and one or more predefined rules, and selecting another subset of the data labels to be displayed on the chart based on the assigned priorities and the overlap conflict resolution.

According to other examples, the method may further include selecting a location for each data label to be displayed based on a location matrix associated with each corresponding vertex. Selecting the location for each data label to be displayed based on the location matrix may include selecting one of eight possible locations in the location matrix based on the attribute of each vertex and a predefined rule. The method may also include determining the attributes of the vertices based on whether a vertex is indicative of a substantial trending change in underlying data of the chart or a non-substantial trending change in the underlying data of the chart.

According to further examples, the method may further include determining the attributes of the vertices based on whether a vertex represents one of a data series beginning, a data series end, a local maximum, a local minimum, a global maximum, a global minimum, or a regular data point. The method may also include, in a semi-automatic mode, taking assigned priorities of a set of user selected vertices into consideration in selecting the other subset of data labels to be displayed. The method may yet include in an automatic mode, taking assigned priorities of all vertices of the chart into consideration in selecting the other subset of data labels to be displayed. The method may also include determining a maximum data label width for the vertices of the chart. The method may further include taking one or more of content, formatting, and corresponding data values for each data label in resolving the overlap conflicts of the subset of the data labels.

According to other examples, a computing device to provide priority based automatic placement of labels on charts is described. The computing device may include a communication interface configured to facilitate communication between the computing device, a display device, and one or more other computing devices; a memory configured to store instructions; and one or more processors coupled to the communication interface and the memory and configured to execute a chart application. The one or more processors may be configured to determine data labels associated with vertices of a chart, determine a maximum data label width for the vertices of the chart, assign priorities to the determined data labels based on attributes of the vertices associated with the data labels, resolve overlap conflicts of a subset of the data labels within a sliding window on the chart based on the assigned priorities, the maximum data label width, and one or more predefined rules, and select another subset of the data labels to be displayed on the chart based on the assigned priorities and the overlap conflict resolution.

According to some examples, the one or more processors may be further configured to iteratively move the sliding window across an axis of the chart such that a set of sorted vertices are within the sliding window at each iteration. The one or more processors may also be configured to implement the sliding window as a priority queue, where data labels in the priority queue are sorted based on not exceeding a right edge (NER), the NER defined as: NER=vertex coordinate+ (maximum data label width+a predefined padding). The priority queue may be implemented as a minimum-based queue such that a top data label in the priority queue has a smallest NER value among the data labels in the priority queue.

According to other examples, the one or more processors may be further configured to identify a currently processed data label based on not exceeding a left edge (NEL), the NEL defined as: NEL=vertex coordinate−(maximum data label width+a predefined padding). The data labels in the priority queue with a NER that is less than the NEL of the currently processed data label may not overlap with the currently processed label. The sliding window may include data labels with a potential overlap with a currently processed data label, and the one or more processors may be configured to, if no overlap is determined, place the currently processed data label in a priority queue and move to next vertex; and, if an overlap is determined, remove one of the currently processed data label and an overlapping data label based on respective priorities. The vertices may be in a Cartesian coordinate system, a polar coordinate system, a cylindrical coordinate system, a spherical coordinate system, or a homogeneous coordinate system.

According to further examples, a hardware computer-readable storage medium with instructions stored thereon to provide priority based automatic placement of labels on charts is described. The instructions, when executed, may cause a computing device to perform actions including determine data labels associated with vertices of a chart; determine a maximum data label width for the vertices of the chart; assign priorities to the determined data labels based on attributes of the vertices associated with the data labels; resolve overlap conflicts of a subset of the data labels within a sliding window on the chart based on the assigned priorities, the maximum data label width, and one or more predefined rules by iteratively moving the sliding window across an axis of the chart such that a set of sorted vertices are within the sliding window at each iteration; and select another subset of the data labels to be displayed on the chart based on the assigned priorities and the overlap conflict resolution.

According to some examples, the set of sorted vertices within the sliding window may be sorted based on a corresponding coordinate of each data point in an ascending order. The actions may further include select one of eight possible locations for each data label to be displayed in a location matrix associated with each corresponding vertex.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A device-implemented method to provide priority-based automatic placement of one or more labels on a chart, the method comprising:
    determining a first data label associated with a first vertex of the chart, the first data label having a left edge and a right edge;
    determining a second data label associated with a second vertex of the chart, the second data label having left edge and a right edge;
    assigning a first priority to the first data label based on an attribute of the first data label;
    assigning a second priority to the second data label based on an attribute of the second data label:
    processing the first and second data labels in ascending order of left edge using a sliding window:
    while processing the first data label, removing any data labels from the sliding window that overlap with the first data label and that have a lower priority than the first data label,
    while processing the first data label, adding the first data label to the sliding window when the first data label does not overlap any of the data labels in the sliding window, wherein the sliding window orders data labels in ascending order by right edge, and
    while processing the second data label, moving a leftmost data label from the sliding window onto the chart when a right edge of the leftmost data label in the sliding window is less than a left edge of the second data label.

2. The method of claim 1, further comprising:
    selecting a location for each data label to be displayed based on a location matrix associated with each corresponding vertex.

3. The method of claim 2, wherein selecting the location for each data label to be displayed based on the location matrix comprises:
    selecting one of eight possible locations in the location matrix based on the attribute of each vertex and a predefined rule.

4. The method of claim 1, further comprising:
    determining the attributes of the vertices based on whether a vertex is indicative of a substantial trending change in underlying data of the chart or a non-substantial trending change in the underlying data of the chart.

5. The method of claim 1, further comprising:
    determining the attributes of the vertices based on whether a vertex represents one of a data series beginning, a data series end, a local maximum, a local minimum, a global maximum, a global minimum, or a regular data point.

6. The method of claim 1, further comprising:
    in a semi-automatic mode, taking assigned priorities of a set of user selected vertices into consideration in selecting data labels to be displayed.

7. The method of claim 1, further comprising:
    in an automatic mode, taking assigned priorities of all vertices of the chart into consideration in selecting data labels to be displayed.

8. The method of claim 1, further comprising:
    taking one or more of content, formatting, and corresponding data values for each data label in resolving the overlap conflicts.

9. The method of claim 1, wherein data labels are stored in the sliding window using a priority queue, wherein the priority queue stores data labels by ascending order of right edges of the data labels, and wherein the top of the priority queue comprises a data label with the lowest right edge value in the priority queue.

10. A computing device to provide priority-based automatic placement of one or more labels on a chart, the computing device comprising:
    a communication interface configured to facilitate communication between the computing device, a display device, and one or more other computing devices;
    a memory configured to store instructions; and
    one or more processors coupled to the communication interface and the memory and configured to execute a chart application, wherein the one or more processors are configured to:
        determine a first data label associated with a first vertex of the chart, the first data label having a left edge and a right edge;
        determine a second data label associated with a second vertex of the chart, the second data label having left edge and a right edge;
        determine a maximum data label width of the first data label and the second data label;
        assign a first priority to the first data label based on an attribute of the first data label;
    assign a second priority to the second data label based on an attribute of the second data label;
    process the first and second data labels in ascending order of left edge using a sliding window;

while processing the first data label, remove any data labels from the sliding window that overlap with the first data label and that have a lower priority than the first data label, while processing the first data label, add the first data label to the sliding window when the first data label does not overlap any of the data labels in the sliding window, wherein the sliding window orders data labels in ascending order by right edge, and while processing the second data label, move a leftmost data label from the sliding window onto the chart when a right edge of the leftmost data label in the sliding window is less than a left edge of the second data label.

11. The computing device of claim 10, wherein the vertices are in a Cartesian coordinate system, a polar coordinate system, a cylindrical coordinate system, a spherical coordinate system, or a homogeneous coordinate system.

12. The computing device of claim 10, wherein data labels are stored in the sliding window using a priority queue, wherein the priority queue stores data labels by ascending order of right edges of the data labels, and wherein the top of the priority queue comprises a data label with the lowest right edge value in the priority queue.

13. The computing device of claim 12, wherein the data labels in the priority queue with a right edge that is less than the left edge of the first data label do not overlap with the second label.

14. The computing device of claim 12, wherein the priority queue includes data labels with a potential overlap with the first data label.

15. A hardware computer-readable storage medium with instructions stored thereon to provide priority-based automatic placement of one or more labels on a chart, the instructions, when executed, causing a computing device to perform actions comprising:

determine a first data label associated with a first vertex of the chart, the first data label having a left edge and a right edge;

determine a second data label associated with a second vertex of the chart, the second data label having left edge and a right edge;

assign a first priority to the first data label based on an attribute of the first data label;

assign a second priority to the second data label based on an attribute of the second data label:

process the first and second data labels in ascending order of left edge using a sliding window;

while processing the first data label, remove any data labels from the sliding window that overlap with the first data label and that have a lower priority than the first data label, while processing the first data label, add the first data label to the sliding window when the first data label does not overlap any of the data labels in the sliding window, wherein the sliding window orders data labels in ascending order by right edge, and while processing the second data label, move a leftmost data label from the sliding window onto the chart when a right edge of the leftmost data label in the sliding window is less than a left edge of the second data label.

16. The hardware computer-readable storage medium of claim 15, wherein the actions further comprise:

select one of eight possible locations for each data label to be displayed in a location matrix associated with each corresponding vertex.

17. The hardware computer-readable storage medium of claim 15, wherein data labels are stored in the sliding window using a priority queue, wherein the priority queue stores data labels by ascending order of right edges of the data labels, and wherein the top of the priority queue comprises a data label with the lowest right edge value in the priority queue.

* * * * *